US012103760B2

(12) United States Patent
Bodet et al.

(10) Patent No.: US 12,103,760 B2
(45) Date of Patent: Oct. 1, 2024

(54) ACTUATOR FOR ACTUATING THE VALVE OF AN AEROSOL GENERATOR

(71) Applicant: LINDAL FRANCE SAS, Val de Briey (FR)

(72) Inventors: Hervé Bodet, Verdun (FR); Eric Gaillard, Dieue-sur-Meuse (FR)

(73) Assignee: LINDAL FRANCE SAS, Val de Briey (FR)

( * ) Notice: Subject to any disclaimer, the term of this patent is extended or adjusted under 35 U.S.C. 154(b) by 122 days.

(21) Appl. No.: 17/795,310

(22) PCT Filed: Feb. 20, 2021

(86) PCT No.: PCT/EP2021/054242
§ 371 (c)(1),
(2) Date: Jul. 26, 2022

(87) PCT Pub. No.: WO2021/165518
PCT Pub. Date: Aug. 26, 2021

(65) Prior Publication Data

US 2023/0095512 A1 Mar. 30, 2023

(30) Foreign Application Priority Data

Feb. 21, 2020 (FR) ....................................... 2001779

(51) Int. Cl.
*B65D 83/20* (2006.01)
*B05B 11/00* (2023.01)
(Continued)

(52) U.S. Cl.
CPC ........ *B65D 83/205* (2013.01); *B05B 11/0027* (2013.01); *B65D 83/40* (2013.01); *B65D 83/22* (2013.01)

(58) Field of Classification Search
CPC ...... B65D 83/205; B65D 83/40; B65D 83/22; B05B 11/0027
See application file for complete search history.

(56) References Cited

U.S. PATENT DOCUMENTS 4,077,549 A * 3/1978 Beard ................ B05B 11/1057
222/402.15
4,353,483 A 10/1982 Pehr
(Continued)

FOREIGN PATENT DOCUMENTS

AU 2002365639 B2 6/2003
CN 101549769 A 10/2009
(Continued)

OTHER PUBLICATIONS

International Search Report and Written Opinion dated May 17, 2021 in corresponding application No. PCT/EP2021/054242; w/ English partial translation and partial machine translation (total 16 pages).
(Continued)

*Primary Examiner* — Frederick C Nicolas
(74) *Attorney, Agent, or Firm* — Seckel IP, PLLC

(57) ABSTRACT

The actuator for an aerosol dispenser is provided with an actuator body which has a skirt, a finger pad, an outlet conduit having a portion (132*a*) which protrudes from the skirt towards the outside, and a cap (20) that can be moved between an open position in which the finger pad is accessible to a user and a closed position in which the finger pad is inaccessible to a user. The cap (20) is fixed to the skirt by a hinge (21) so that it can pivot around the hinge between the open position and the closed position, and provided with a slot (24) which straddles the protruding portion (132*a*) of the outlet conduit when the cap is in the closed position or close to the closed position.

20 Claims, 3 Drawing Sheets

(51) Int. Cl.

| | |
|---|---|
| ***B65D 83/40*** | (2006.01) |
| *B65D 83/22* | (2006.01) |

(56) References Cited

U.S. PATENT DOCUMENTS

| | | | | |
|---|---|---|---|---|
| 4,941,600 | A * | 7/1990 | Berriochoa | B65D 83/303 222/402.13 |
| 5,092,493 | A | 3/1992 | Pehr | |
| 5,392,938 | A | 2/1995 | Dubach | |
| 6,179,259 | B1 * | 1/2001 | Schioldager | B65D 83/40 248/314 |
| 6,269,986 | B1 | 8/2001 | Gross | |
| 7,073,733 | B2 * | 7/2006 | Cohen | B05B 11/1054 239/89 |
| 9,815,612 | B1 * | 11/2017 | Caruso | B65D 83/205 |
| 9,938,069 | B2 * | 4/2018 | Nwaigwe | B65D 83/386 |
| 2002/0148860 | A1 | 10/2002 | Cohen et al. | |
| 2006/0138176 | A1 * | 6/2006 | Lasserre | B05B 11/1059 222/321.8 |
| 2008/0169261 | A1 | 7/2008 | Druitt et al. | |
| 2009/0236373 | A1 | 9/2009 | Laib et al. | |
| 2009/0242502 | A1 | 10/2009 | Qin | |
| 2009/0255958 | A1 | 10/2009 | Santoni et al. | |
| 2010/0155427 | A1 * | 6/2010 | Lilienthal | B65D 83/205 222/182 |
| 2011/0006083 | A1 | 1/2011 | Walters et al. | |
| 2014/0097150 | A1 | 4/2014 | Antier et al. | |
| 2016/0145032 | A1 * | 5/2016 | Fournet | B65D 83/757 222/153.07 |
| 2016/0207693 | A1 | 7/2016 | Carpenter et al. | |
| 2023/0406604 | A1 * | 12/2023 | Bodet | B65D 83/205 |

FOREIGN PATENT DOCUMENTS

| | | | |
|---|---|---|---|
| CN | 208264998 | U | 12/2018 |
| EP | 0052990 | A1 | 6/1982 |
| EP | 2135680 | A1 | 12/2009 |
| EP | 2633919 | A2 | 9/2013 |
| FR | 2832390 | A1 | 5/2003 |
| FR | 3007299 | A1 | 12/2014 |
| JP | H06-134357 | A | 5/1994 |
| JP | 2004099068 | A | 4/2004 |
| JP | 2006089110 | A | 4/2006 |
| JP | 2007331788 | A | 12/2007 |

OTHER PUBLICATIONS

Chinese Office Action dated May 27, 2023 in counterpart application No. CN 202180007916.8; w/English translation (total 17 pages) (note: D1, JP2007331788, and D2, FR3007299 cited in the CN Office Action are not listed in this IDS since they were already listed in the IDS filed Jul. 26, 2022).

International Search Report dated Sep. 15, 2014 in application No. PCT/EP2014/062125, abandoned U.S. Appl. No. 14/898,290 (US20160145032) corresponding to FR3007299 (Lindal France) (Note: FR3007299, U.S. Appl. No. 14/898,290, and U.S. Appl. No. 14/898,290 cited by the Examiner in abandoned U.S. Appl. No. 14/898,290, are not listed on this IDS form since they are already listed on another IDS form submitted concurrently).

* cited by examiner

[Fig 1]
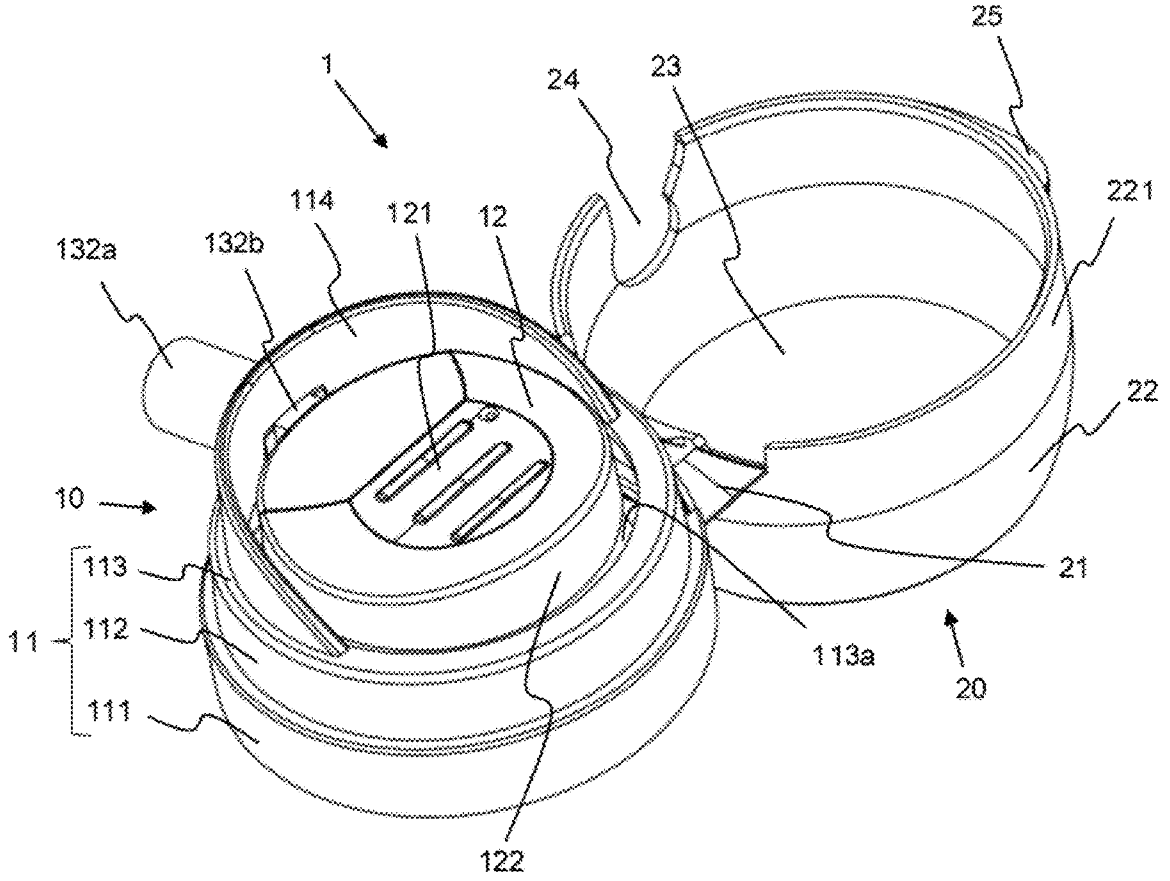
[Fig. 2]
Fig. 2a
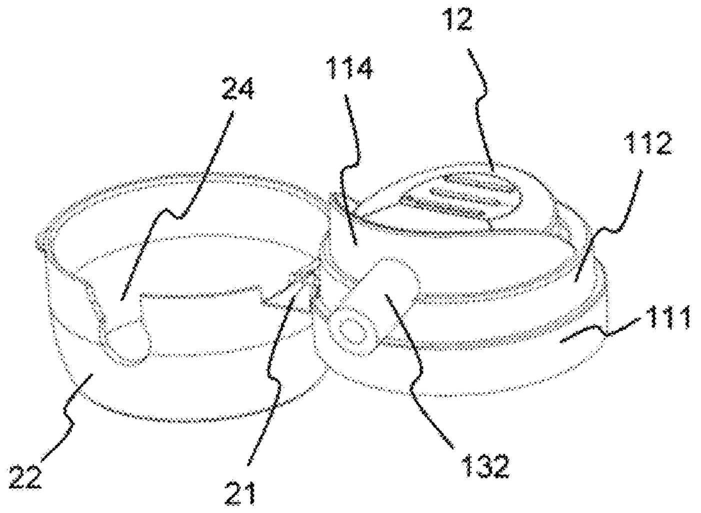
Fig. 2b
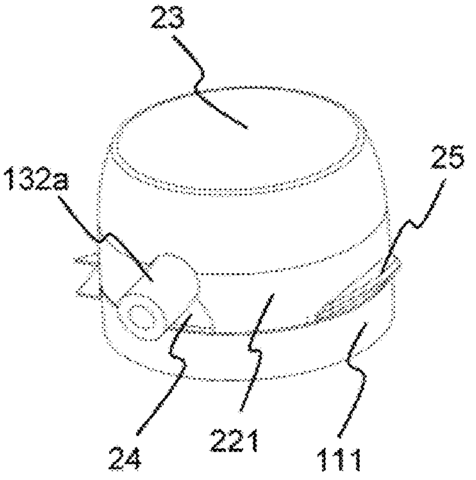

[Fig. 3]
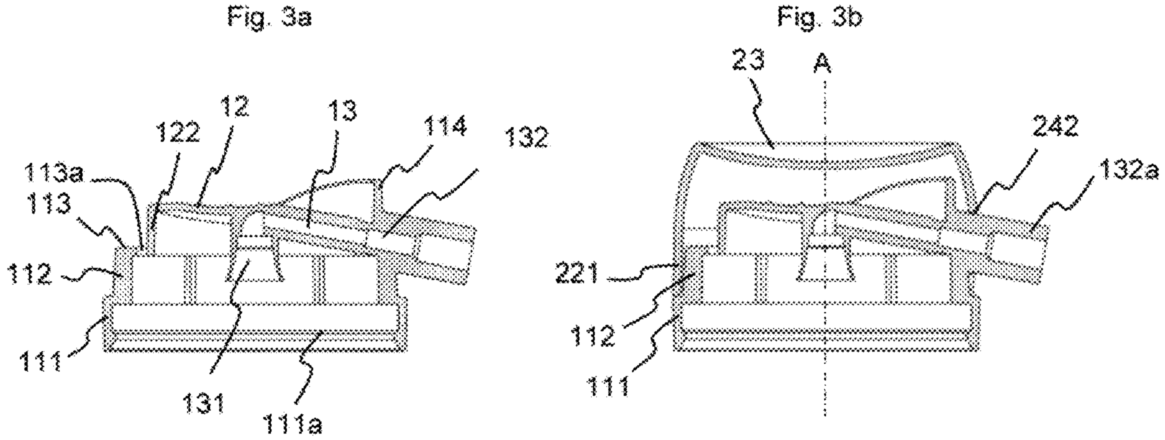
[Fig. 4]
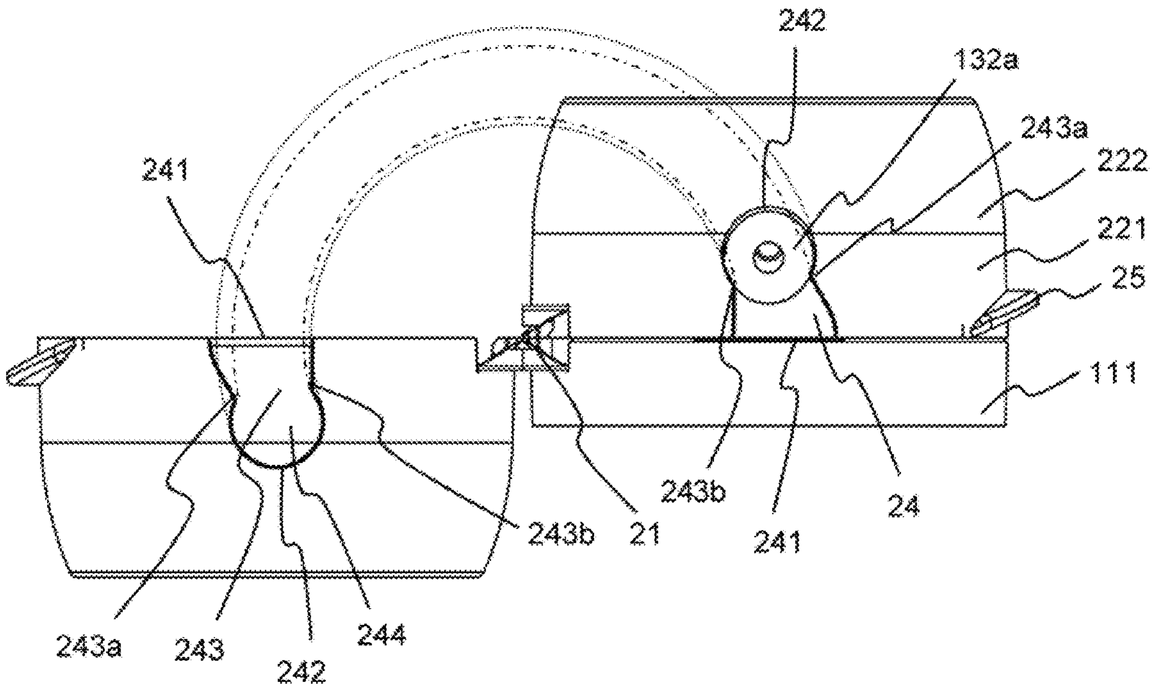

[Fig. 5]
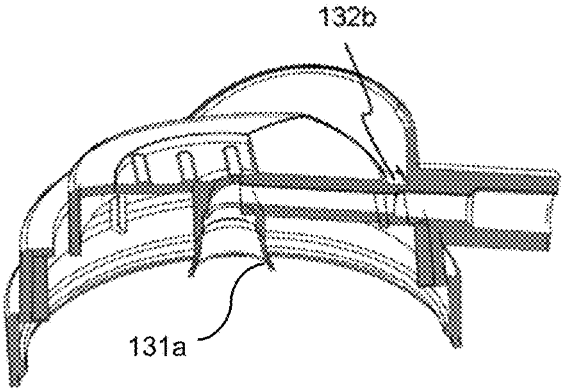
[Fig. 6a]
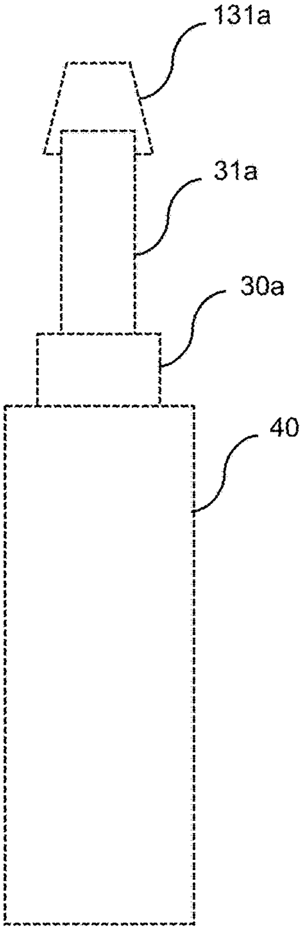
[Fig. 6b]
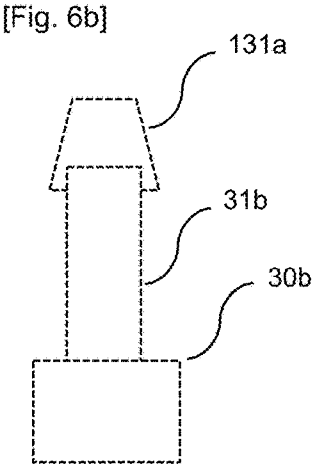
[Fig. 6c]
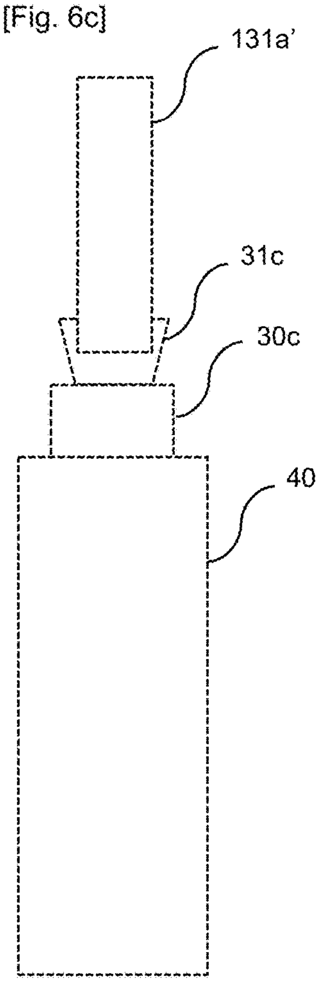

ACTUATOR FOR ACTUATING THE VALVE OF AN AEROSOL GENERATOR

BACKGROUND ART

The invention relates to an actuator for actuating a withdrawal device of a container, such as the valve of an aerosol dispenser. The actuator is provided with

- an actuator body which has
  - a skirt,
  - a finger pad,
  - an outlet conduit having a first end provided with actuating means for actuating the withdrawal device when a user presses the finger pad, and a second end, a portion of which protrudes from the skirt towards the outside, and
- a cap that can be moved between an open position in which the finger pad is accessible to a user and a closed position in which the finger pad is inaccessible to a user.

Such actuators fitted with an outlet conduit protruding from the skirt make it possible to direct the product very precisely towards where it is to be applied.

In order to prevent the finger pad from being actuated inadvertently, it is known to fit a cap over the actuator body to cover the finger pad and thus make it inaccessible. These removable caps are provided with a slot extending axially from the lower edge of the cap towards the top of the cap. To access the finger pad, the cap must therefore be removed. However, it often happens that the user loses the cap so that he can no longer close the actuator, or that he let it fall so that the cap is damaged or dirty.

SUMMARY OF THE INVENTION

The object of the invention is to remedy these drawbacks, and in particular to ensure that the cap cannot fall or be lost.

This objective is achieved in that

- the cap is attached to the skirt by a hinge so that it can pivot around the hinge between the open position and the closed position, and in that
- the cap is provided with a slot which overlaps the protruding portion of the outlet conduit when the cap is in the closed position or close to the closed position.

Since the cap is fixed to the actuator body, there is no longer a risk of it being lost or falling off, at the risk of getting damaged or dirty.

The slot is preferably inclined. In particular, at least the side of the slot opposite from the hinge can be in the shape of an arc of a circle around the hinge.

To facilitate demolding, the side of the slot close to the hinge may be straight, and in particular parallel to a main axis of the first end of the outlet conduit when the cap is in the closed position.

Retaining means may be provided to retain the cap in the closed position, the effect of the retaining means being able to be overcome manually. This ensures that the cap cannot be opened inadvertently. The retaining means can be constituted by a constriction made in the slot, preferably by forming, in the bottom of the slot, a space in the shape of an arc of a circle extending over more than 180°. The constriction is preferably formed by at least one nose made on one side of the passage slot, preferably completed by a second nose made on the second side of the slot. To facilitate the opening of the cap and overcome the retaining means, the cap can be provided with a visor which is preferably arranged opposite from the hinge.

The outlet conduit can be fixed to the inner face of the finger pad or to the skirt.

The finger pad is preferably attached to the skirt by a strip of material around which it can pivot to actuate the withdrawal device. This strip of material may be constituted by a portion of the outlet conduit when the latter is fixed to the inner face of the finger pad.

The actuating means can be constituted by an endpiece intended to cooperate with the outlet rod of the stem of a male type valve of a pressurized container or with the outlet tube of a manual pump. They can also be constituted by an outlet rod intended to cooperate with the seat of a female valve of a pressurized container.

To improve the aesthetics of the actuator, it is preferable to adapt the outer shape of the actuator body and the outer shape of the cap to each other so that, in the closed position of the cap, the cap is in the extension of the portion of the actuator body not covered by the cap, so as to give an impression of continuity.

BRIEF DESCRIPTION OF THE DRAWINGS

The invention is explained in more detail below using the figures which show:

FIG. 1 a rear perspective view of the actuator, with the cap in the open position;

FIG. 2 front perspective views of the actuator, with the cap (a) in the open position and (b) in the closed position;

FIG. 3 views of the actuator in cross-section passing through the outlet conduit, with the cap (a) in the open position and (b) in the closed position;

FIG. 4 a front view in vertical cross-section passing through the center of the receiving recess, showing the travel of different remarkable points of the passage slot;

FIG. 5 an isometric view in cross-section of the actuator body.

FIG. 6*a* a schematic view of an actuator on a pressurized container, with the actuating means constituted by an endpiece, intended to cooperate with the outlet rod of the stem of a male type valve of the pressurized container.

FIG. 6*b* a schematic view of an actuator on a pressurized container, with the actuating means constituted by an endpiece, intended to cooperate with the outlet tube of a manual pump.

FIG. 6*c* a schematic view of an actuator on a pressurized container, with the actuating means constituted by an outlet rod, intended to cooperate with the seat of a female valve of a pressurized container.

DETAILED DESCRIPTION OF PARTICULAR EMBODIMENTS

The actuator (1) essentially comprises an actuator body (10) and a cap (20). It is intended to distribute a product taken from a container equipped with a withdrawal device. It can be a pressurized container fitted with a valve, such as an aerosol or foam dispenser. It can also be a container containing, for example, a cosmetic product to be withdrawn by means of a manual pump, such as liquid soap or body cream.

The actuator is shown in the figures so as to be placed above a container. It is self-evident that it could be used in any position, especially upside down. Spatial references such as "upper"/"lower" or "up"/"down" refer to the actuator as shown in the figures. In the closed position of the cap, the actuator extends along a main axis (A). The spatial references "axial" and "radial" refer to this main axis. In the example presented here, the actuator, in the closed position of the cap, has a certain axial symmetry of revolution around this main axis (A).

The actuator body comprises in particular a skirt (11), a finger pad (12), and an outlet conduit (13).

The skirt (11) is formed of a tubular wall which extends in the direction of the main axis (A). It is divided into a lower section (111) and an upper section (112) which is narrower so that a slight step is formed between the two sections. The lower section (111) is provided on its inner face with fixing means (111*a*) making it possible to fix the actuator on the container. In the example presented here, these fastening means are constituted by an extra thickness that can be snapped onto the container, for example behind the rolled edge located at the junction between the valve cup and the container of an aerosol dispenser. Other fixing methods could be provided, such as screwing, for example.

The upper section (112) ends, opposite from the lower section (111), with a top edge (113) extending towards the inside of the actuator, leaving an opening for the finger pad (12). A shield (114) in the shape of an arc of a circle oriented vertically and upwards is placed on the upper face of the top edge (113), on both sides of the end of the outlet conduit. This shield (114) serves in particular to stiffen the portion (132*a*) downstream of the outlet conduit.

The finger pad (12) is formed by a wall forming a pressing surface (121) which ends with a peripheral rim (122) directed towards the center of the actuator. The finger pad is placed in the opening of top edge (113), while providing a gap (113*a*) between the flange (122) of the finger pad and the edge of the opening of the top edge (113). The finger pad (12) is fixed to the skirt (11) by a strip of material so that, when the user presses on the finger pad to actuate the withdrawal device, the finger pad can pivot around the strip of material.

The outlet conduit (13) makes it possible to transfer the product withdrawn from the container to the outside of the actuator by means of the withdrawal device. It is divided into a first section (131) substantially vertical and concentric with the main axis (A) and a second section (132) inclined with respect to the first. The free end of the first section (131) is provided with actuating means making it possible to actuate the withdrawal device when the user presses the finger pad. The downstream portion (132*a*) of the second section protrudes from the skirt so that its axial projection parallel to the main axis (A) protrudes radially towards the outside of the axial projection of the skirt. In the present example, the strip of material connecting the finger pad (12) to the skirt (11) is constituted by a portion (132*b*) of the second section (132) of the outlet conduit located between the peripheral rim (122) of the finger pad and the shield (114), as clearly visible in FIG. 5. In the embodiment shown on FIG. 6*a*, the actuating means is constituted by an end-piece (131*a*), as also shown on FIG. 5, intended to cooperate with the outlet rod (31*a*) of the stem of a male type valve (30*a*) of a pressurized container (40) or with the outlet tube (31*b*) of a manual pump (30*b*), as illustrated schematically on FIGS. 6*a* and 6*b*, respectively. Alternatively, the actuating means (131) can be constituted by an outlet rod (131*a*') intended to cooperate with the seat (31*c*) of a female valve (30*c*) of a pressurized container, as illustrated schematically on FIG. 6*c*, for example.

The cap (20) is articulated on the skirt (10) by a hinge (21). The cap can therefore pivot about a pivot axis of this hinge between a wide open position, in which it is spaced apart from the body of the actuator and allows access to the finger pad, and a closed position, in which it covers the finger pad, making it inaccessible. In the present case, the hinge is a butterfly hinge which tends to maintain the cap either in the wide open position or in the closed position, so that, as soon as the cap has passed a certain angle, it automatically moves towards the corresponding extreme position.

The cap (20) is constituted by a tubular wall (22) closed at its top by a top wall (23). The shape of the lower portion (221) of the tubular wall is designed so that, in the closed position of the cap, this lower portion (221) comes to surround the upper section (112) of the skirt and is located close to the step between the two sections, in the extension of the lower section (111), so as to give the impression of a continuity of shape.

In order to circumvent the protruding portion (132*a*) of the outlet conduit, the cap (20) is provided with a slot (24) made in the tubular wall (22). The slot passes through the entire thickness of the wall. At a first inlet end (241), the slot opens at the edge of the tubular wall (22) which is opposite from the top wall, and it terminates at the other end by a bottom (242) in the shape of a semicircle. This slot extends in the shape of an arc of a circle around the pivot axis of the hinge. It is dimensioned to allow the protruding portion (132*a*) of the outlet conduit to pass, preferably without friction.

In order to retain the cap in the closed position and thus avoid an undesired opening of the cap, retaining means are provided which, in the present example, take the form of a constriction (243) located near the bottom of the slot. This constriction delimits an arcuate space (244) which extends over more than 180° and which is large enough to receive the protruding portion of the outlet conduit when the cap is in the closed position. Conversely, the width of the slot in the constriction (243) is less than the width of the protruding portion (132*a*) of the outlet conduit. To reach the closed position, or to come out of it, it is therefore necessary to force the constriction (243) to pass around the outlet conduit. The spring effect of the butterfly hinge is not sufficient to overcome the constriction. FIG. 4 shows schematically how the constriction (243), in the closed position of the cap, comes to be located under the protruding portion of the outlet conduit. A visor (25) placed on the tubular wall (22) of the cap, opposite from the hinge, facilitates opening of the cap.

The constriction is formed by a first nose (243*a*) made on the edge of the slot opposite from the hinge. A second nose (243*b*) of smaller size is made in the other edge of the slot.

To close the cap (20), the user folds it towards the actuator body (10) until it passes the neutral point of the butterfly hinge (21). From there, the cap continues to pivot around the pivot axis of the hinge, either under the spring effect of the butterfly hinge or under the effect of the user's finger. As it approaches the closed position, the slot (24) straddles the projection (132*a*) of the outlet conduit until the constriction noses (243*a*, 243*b*) abut against it (132*a*). It is then necessary for the user to press on the top wall (23) or on the visor (25) to overcome the resistance of the constriction. As soon as the constriction has been passed, the protruding portion enters the arcuate space (244) in which it is retained by the noses. To open, the user must lift the cap by exerting an upward pressure on the visor so as to pass, on the one hand, the constriction, and on the other hand, the neutral point of the butterfly hinge. When this neutral point has been passed, the cap swings automatically into the wide open position.

To facilitate molding of the cap, the edge of the slot (24) which is close to the hinge (21) is preferably straight. It follows that the slot is wider at its inlet end (241) than in the arcuate space (244). In the present case, this straight edge extends up to the constriction. In the closed position of the cap, this straight edge is substantially parallel to the main axis (A) passing through the first end (and the first section) of the outlet conduit.

In the example presented here, the outlet conduit (13) is fixed to the finger pad and constitutes the strip of material connecting the finger pad to the skirt. It would be possible for the outlet conduit to be fixed to the skirt and for the finger pad, fixed to the skirt by a strip of specific material, to press against the top of the first section of the conduit when the user pushes the finger pad down to actuate the withdrawal device.

When the cap is folded down in the closed position, a portion of the protruding end projects from the cap as shown in FIG. 3*b*. To protect this end, if the end does not protrude much, the cap could for example be thickened in the area of the slot, and if necessary, the outside face of the slot could be closed, so that the slot does not completely pass through the thickness of the cap. If the protruding end is too long, a channel can be provided, extending radially toward the outside at least around the arcuate space, or even over the entire length of the slot. This channel may be closed at its outer radial end to protect the outlet opening of the channel.

The actuator can be obtained by molding.

The base body and the cap can be made from one of the following materials:

a polymer material, in particular polyethylene (PE), polypropylene (PP), polylactic acid (PLA), polyhydroxyalkanoates (PHA), poly(butylene succinate) (PBS), or a mixture of these, which polymer can contain mineral fillers, in particular glass and/or basalt, and/or be reinforced with mineral or vegetal fibers, a lignin-based material, preferably cardboard and/or wood, a material containing textiles, a metal, or a mixture of these materials.

The cap and the base body are not necessarily made of the same material.

The actuator shown in the figures is intended for a male type valve such as those found in aerosol or foam dispensers, or more generally pressurized containers. By replacing the endpiece (131*a*) with the outlet rod, the actuator could be used with a female type valve. The endpiece can also be dimensioned to cooperate with the outlet tube of a manual pump such as those found in cosmetic products.

Thanks to the actuator of the invention, it is possible to close the actuator having the protruding outlet channel with a cap fixed to the actuator and pivoting with respect thereto. There is no more risk of losing the cap or of getting it dirty or damaging it by dropping it.

List of references

| | |
|---|---|
| 1 | Actuator |
| 10 | Actuator body |
| 11 | Skirt |
| 111 | Lower section |
| 111a | Fixing means |
| 112 | Upper Section |
| 113 | Top edge |
| 113a | Interstice |
| 114 | Shield |
| 12 | Finger pad |
| 121 | Pressing surface |
| 122 | Perimeter edge |
| 13 | Outlet conduit |
| 131 | First section |
| 131a | Actuating means |
| 132 | Second section |
| 132a | Protruding portion |
| 132b | Portion serving as a strip of material connecting the finger pad to the skirt |
| 20 | Cap |
| 21 | Hinge |
| 22 | Tubular wall |
| 221 | Lower portion |
| 23 | Top wall |
| 24 | Passage slot |
| 241 | Open end of the slot |
| 242 | Bottom of the slot |
| 243 | Constriction |
| 243a | 1st constriction nose |
| 243b | 2nd constriction nose |
| 244 | Space in the shape of an arc of a circle |
| 25 | Visor |
| 30a | Male type valve |
| 31a | Outlet rod |
| 30b | Manual pump |
| 31b | Outlet tube |
| 30c | Female type valve |
| 31c | Seat |
| 40 | Pressurized container |

The invention claimed is:

1. An actuator for actuating a withdrawal device of a container, actuator is provided with an actuator body which has a skirt, a finger pad, an outlet conduit having a first end provided with actuating means for actuating the withdrawal device when a user presses the finger pad, and a second end, wherein a portion of the second end of the outlet conduit is a protruding portion which protrudes from the skirt towards the outside, and a cap that can be moved between an open position in which the finger pad is accessible to a user and a closed position in which the finger pad is inaccessible to a user, wherein the cap is fixed to the skirt by a hinge so that the cap can pivot around the hinge between the open position and the closed position, and wherein the cap is provided with a slot which straddles the protruding portion when the cap is in the closed position or close to the closed position.

2. The actuator according to claim 1, wherein the slot is inclined.

3. The actuator according to claim 2, wherein a side of the slot close to the hinge is straight.

4. The actuator according to claim 1, wherein retaining means are provided to retain the cap in the closed position, a retaining effect of the retaining means being able to be overcome manually.

5. The actuator according to claim 4, wherein the retaining means are constituted by a constriction made in the slot.

6. The actuator according to claim 5, wherein the constriction is formed by at least one nose made on one side of the slot.

7. The actuator according to claim 1, wherein the cap is provided with a visor to facilitate opening of the cap.

8. The actuator according to claim 1, wherein the outlet conduit is fixed to an inner face of the finger pad.

9. The actuator according to claim 1, wherein the finger pad is fixed to the skirt by a strip of material around which the finger pad can pivot to actuate the withdrawal device.

10. The actuator according to claim 1, wherein the actuating means are constituted by an endpiece intended to cooperate with an outlet rod of a stem of a male-type valve of a pressurized container or with an outlet tube of a manual pump.

11. The actuator according to claim 1, wherein an outer shape of the actuator body and an outer shape of the cap are adapted to each other so that, in the closed position of the cap, the cap is in extension of a portion of the actuator body not covered by the cap.

12. The actuator according to claim 2, wherein at least a side of the slot remote from the hinge has a shape of an arc of a circle around the hinge.

13. The actuator according to claim 3, wherein the side of the slot close to the hinge is parallel to a main axis of the first end of the outlet conduit when the cap is in the closed position.

14. The actuator according to claim 5, wherein the constriction is made in the slot by forming, in a bottom of the slot, a space having a shape of an arc of a circle extending over more than 180°.

15. The actuator according to claim 6, wherein the constriction comprises a nose made on a first side of the slot and a second nose made on a second side of the slot.

16. The actuator according to claim 7, wherein the visor is arranged opposite from the hinge.

17. The actuator according to claim 1, wherein the outlet conduit is fixed to the skirt.

18. The actuator according to claim 1, wherein the actuating means are constituted by an outlet rod intended to cooperate with a seat of a female valve of a pressurized container.

19. The actuator according to claim 2, wherein retaining means are provided to retain the cap in the closed position, a retaining effect of the retaining means being able to be overcome manually.

20. The actuator according to claim 3, wherein retaining means are provided to retain the cap in the closed position, a retaining effect of the retaining means being able to be overcome manually.

* * * * *